Patented June 16, 1953

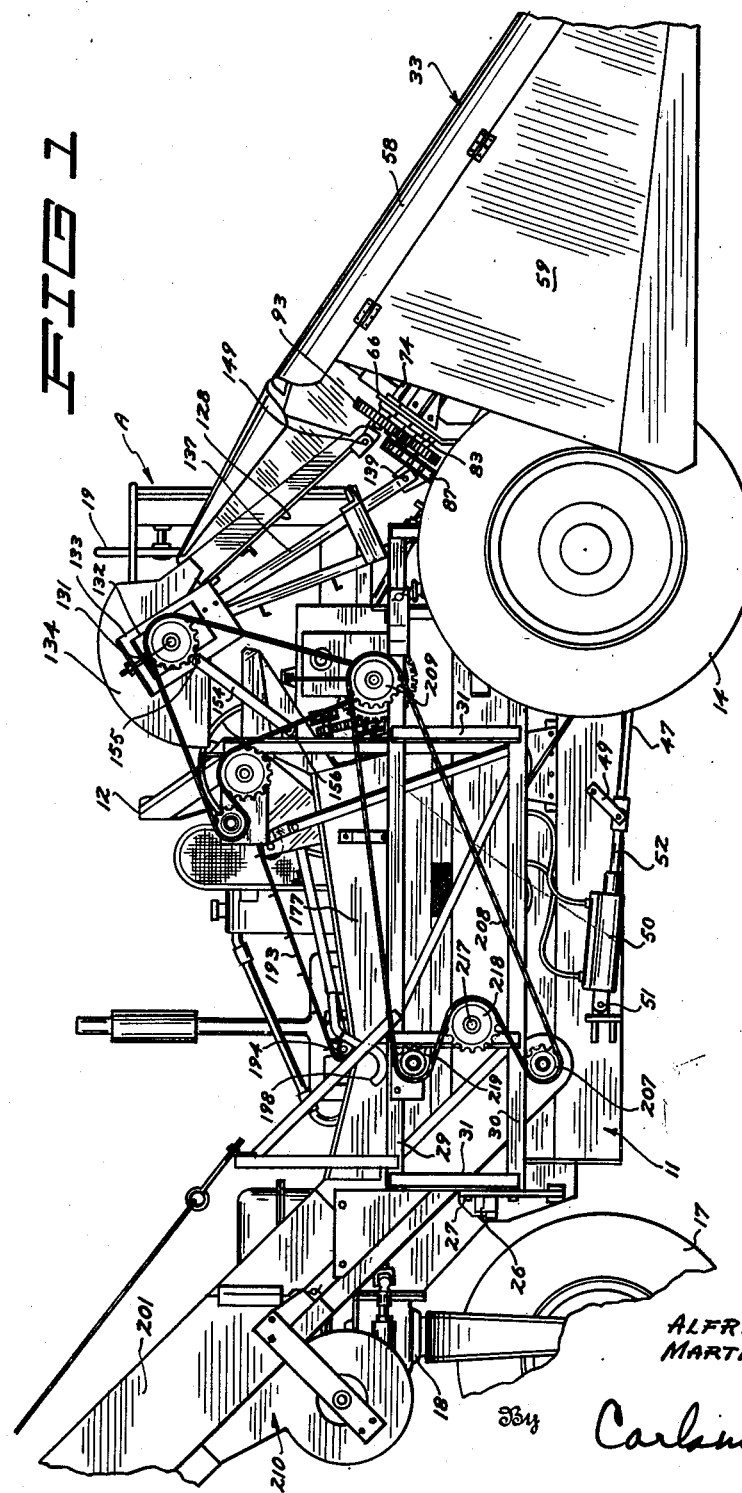

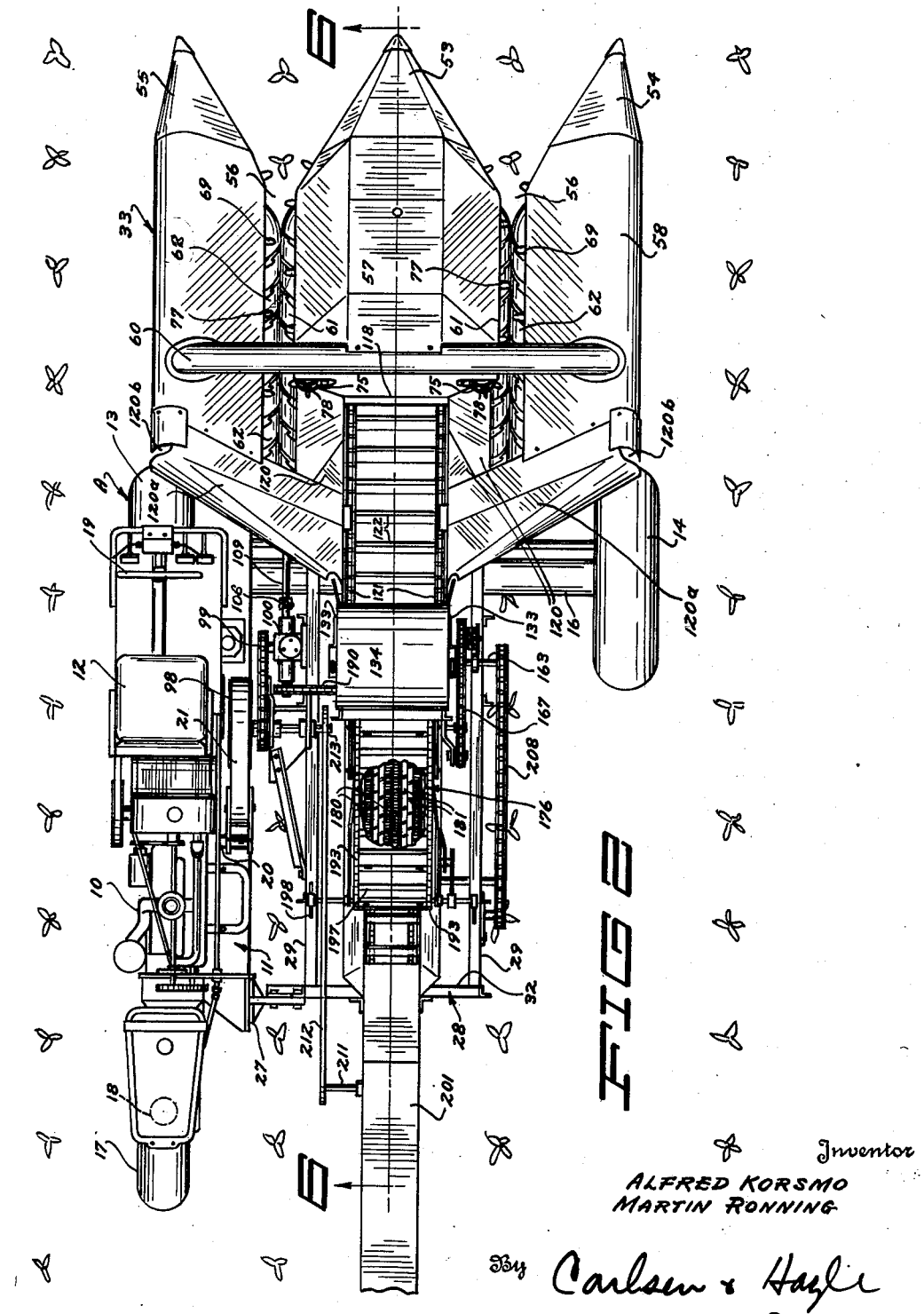

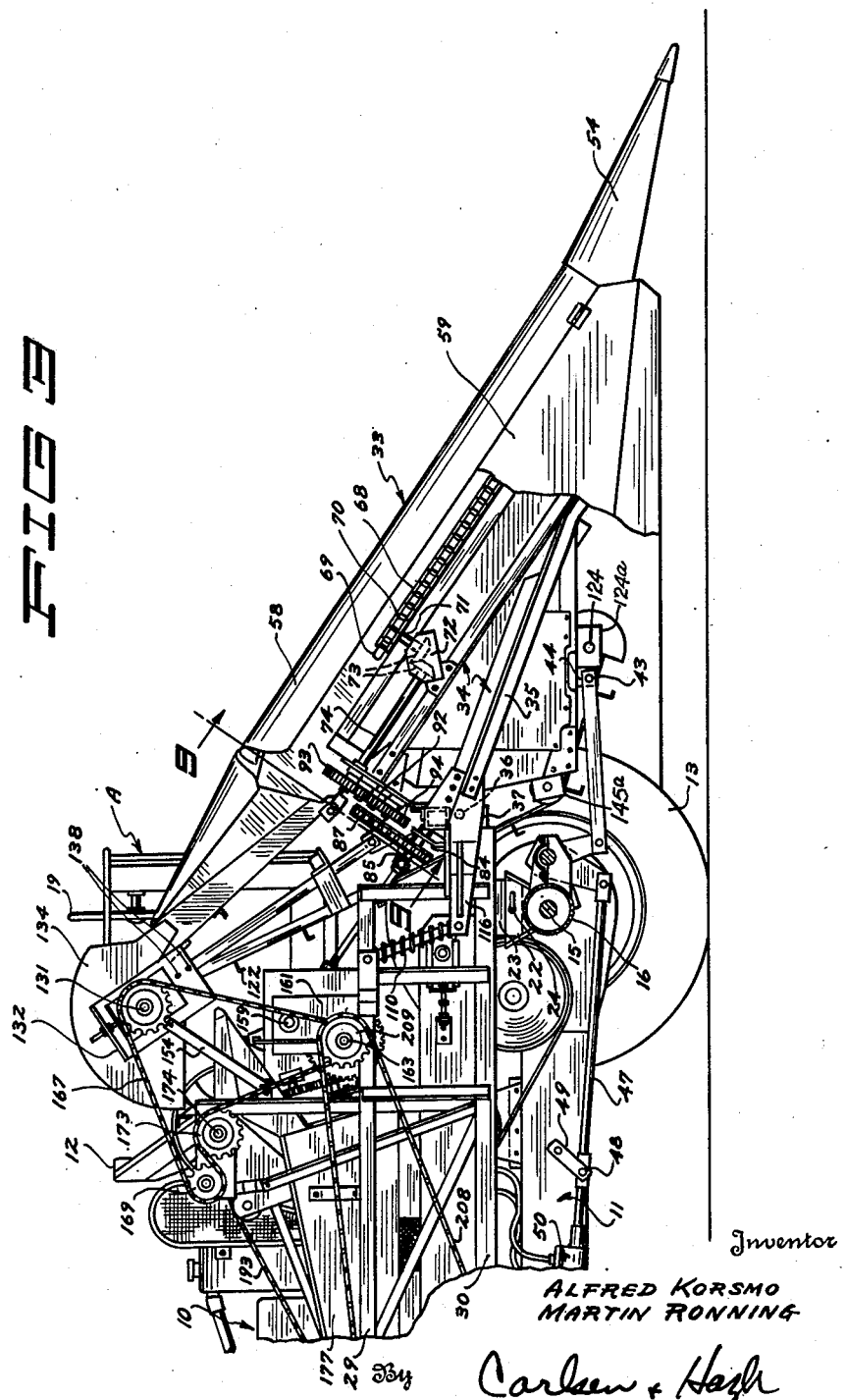

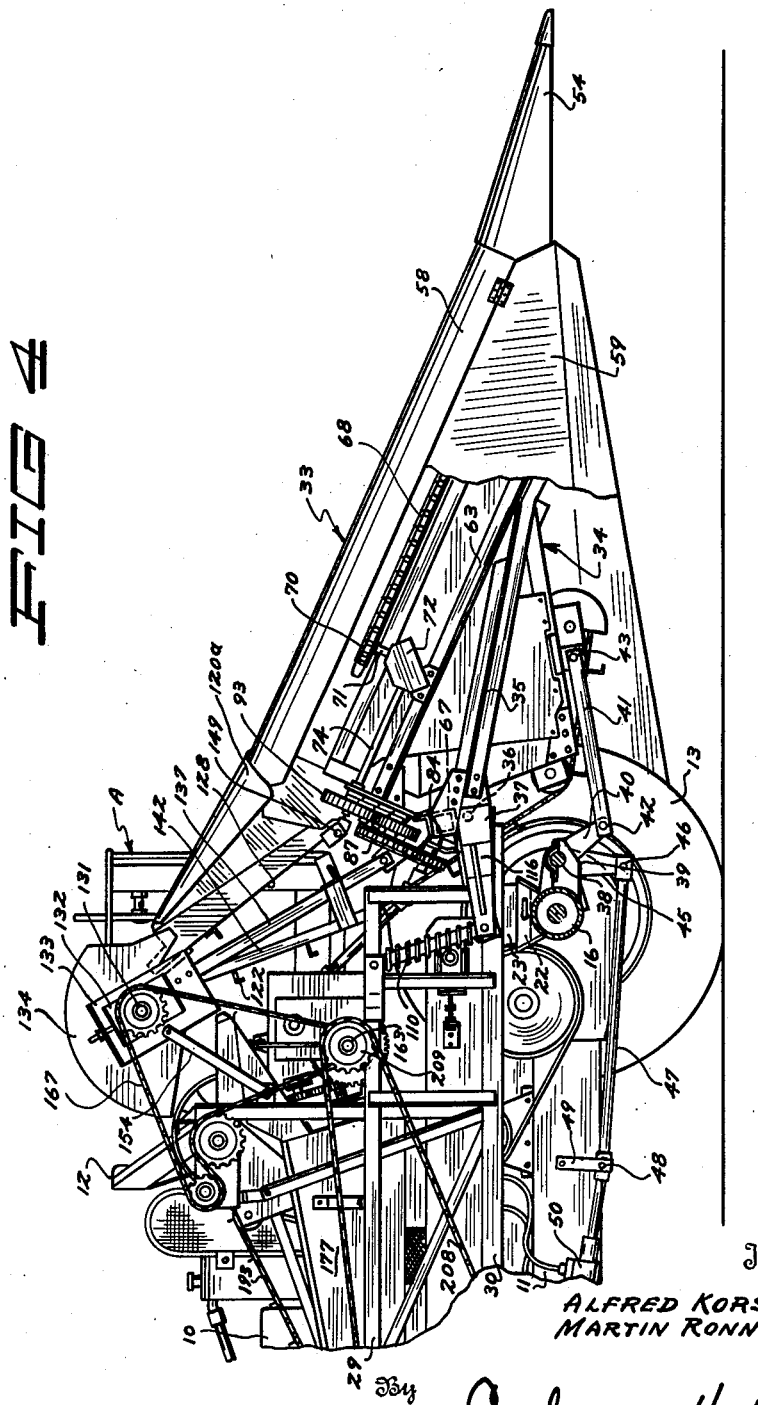

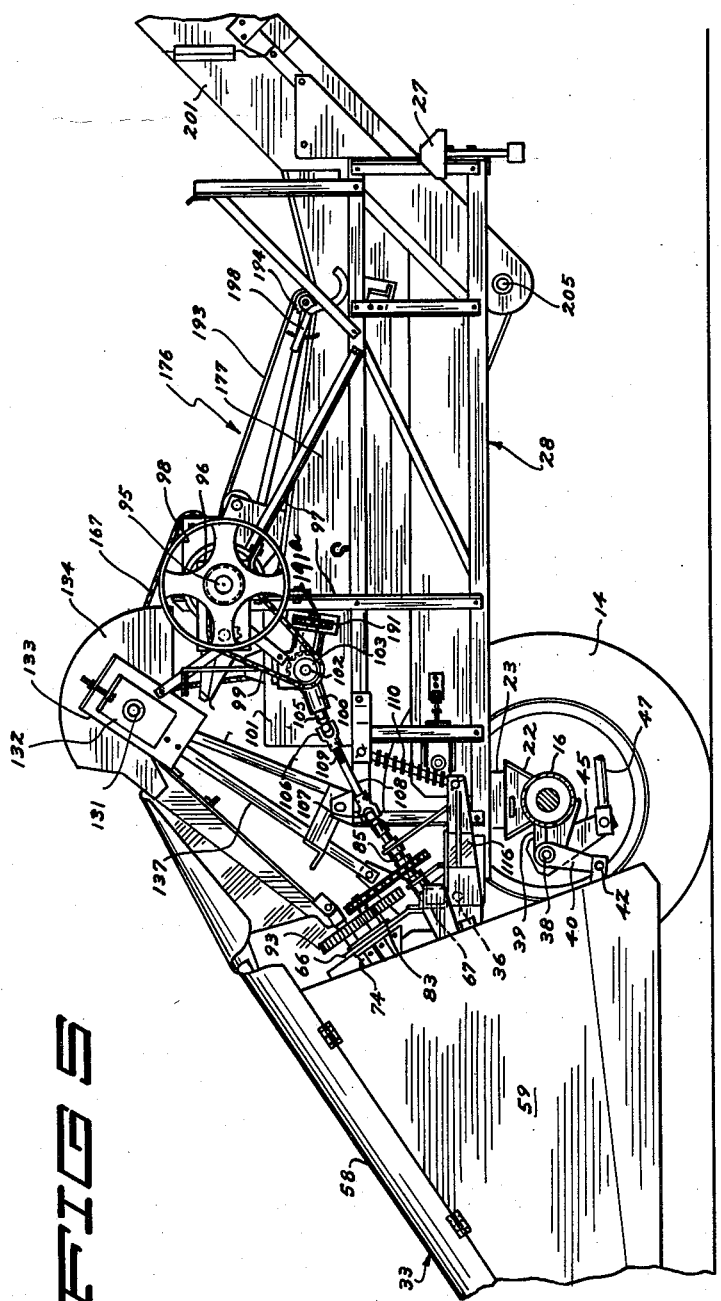

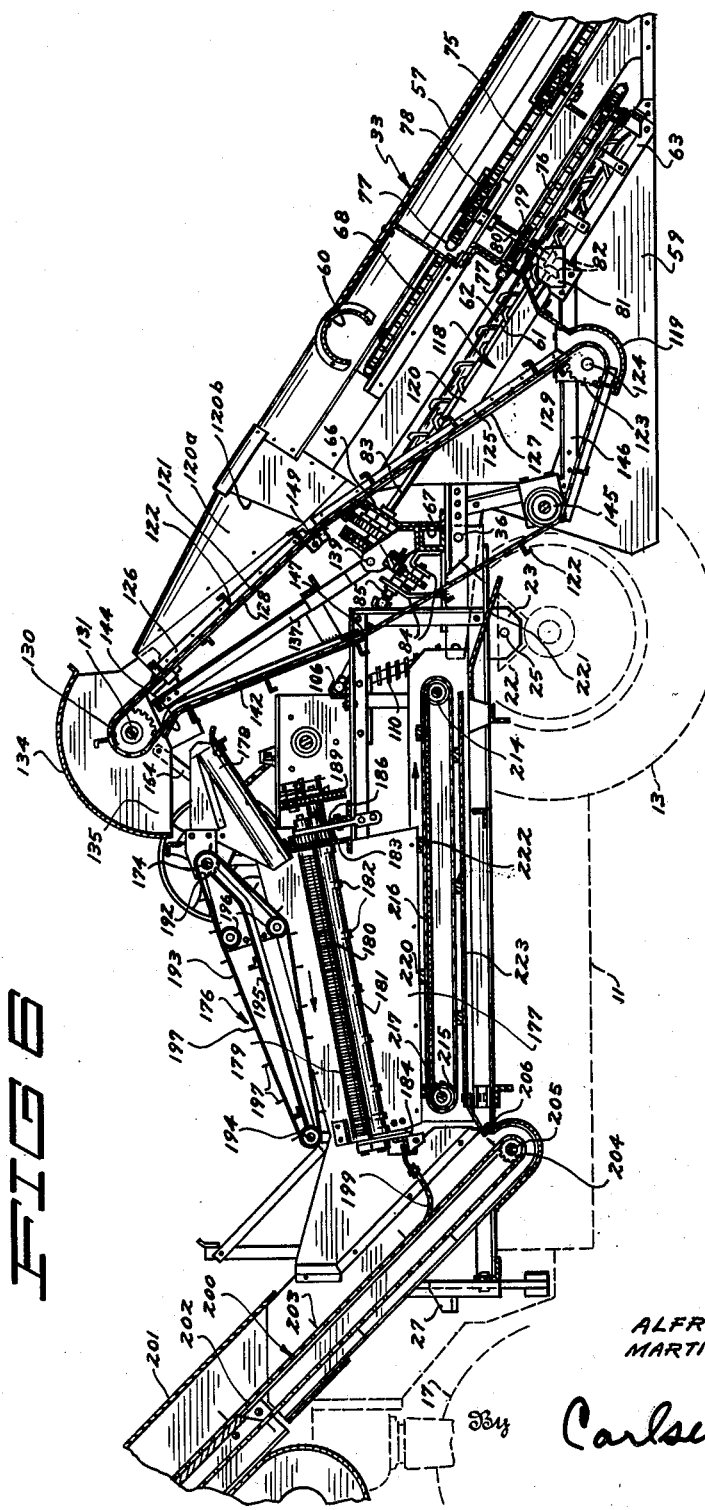

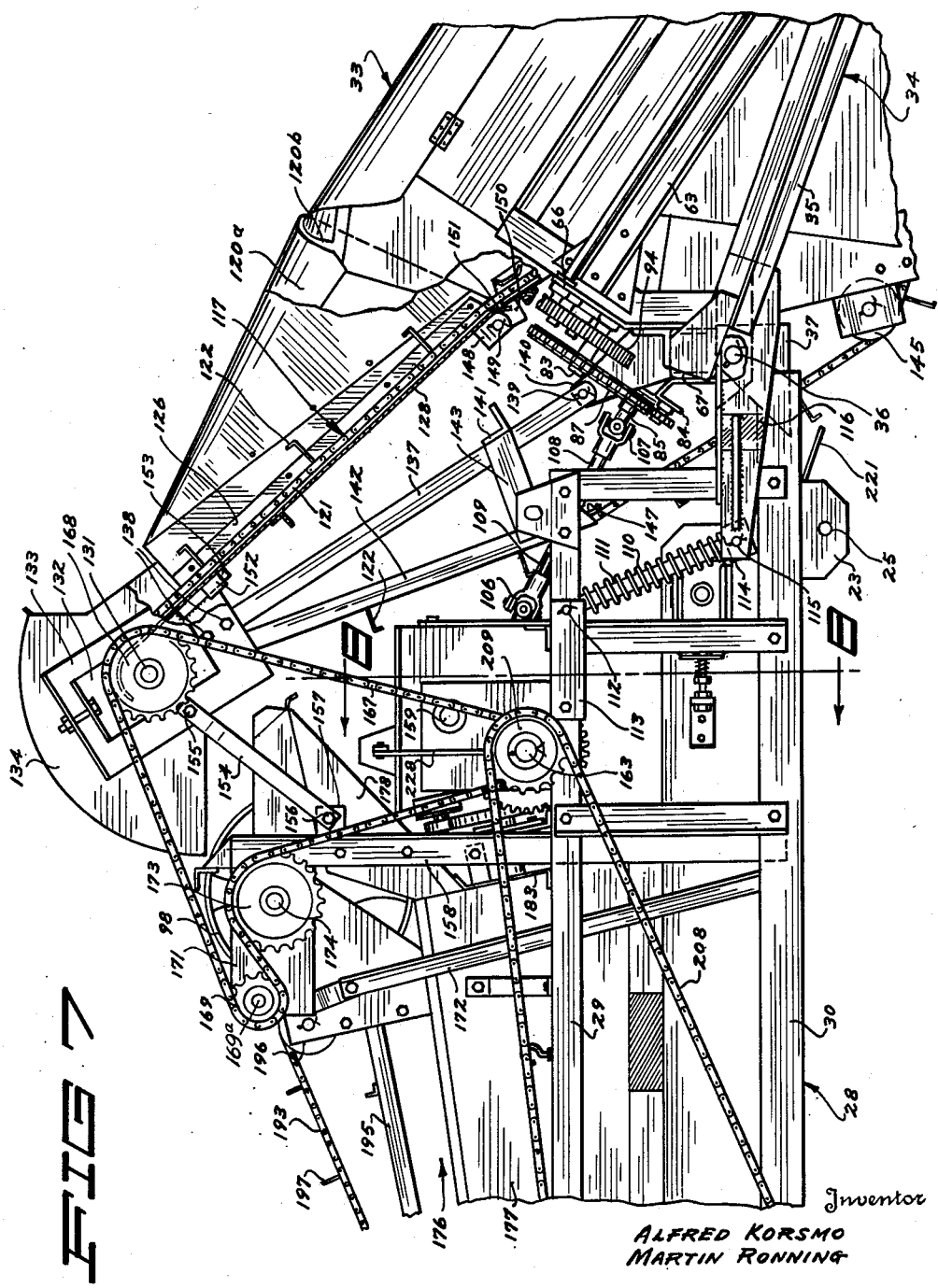

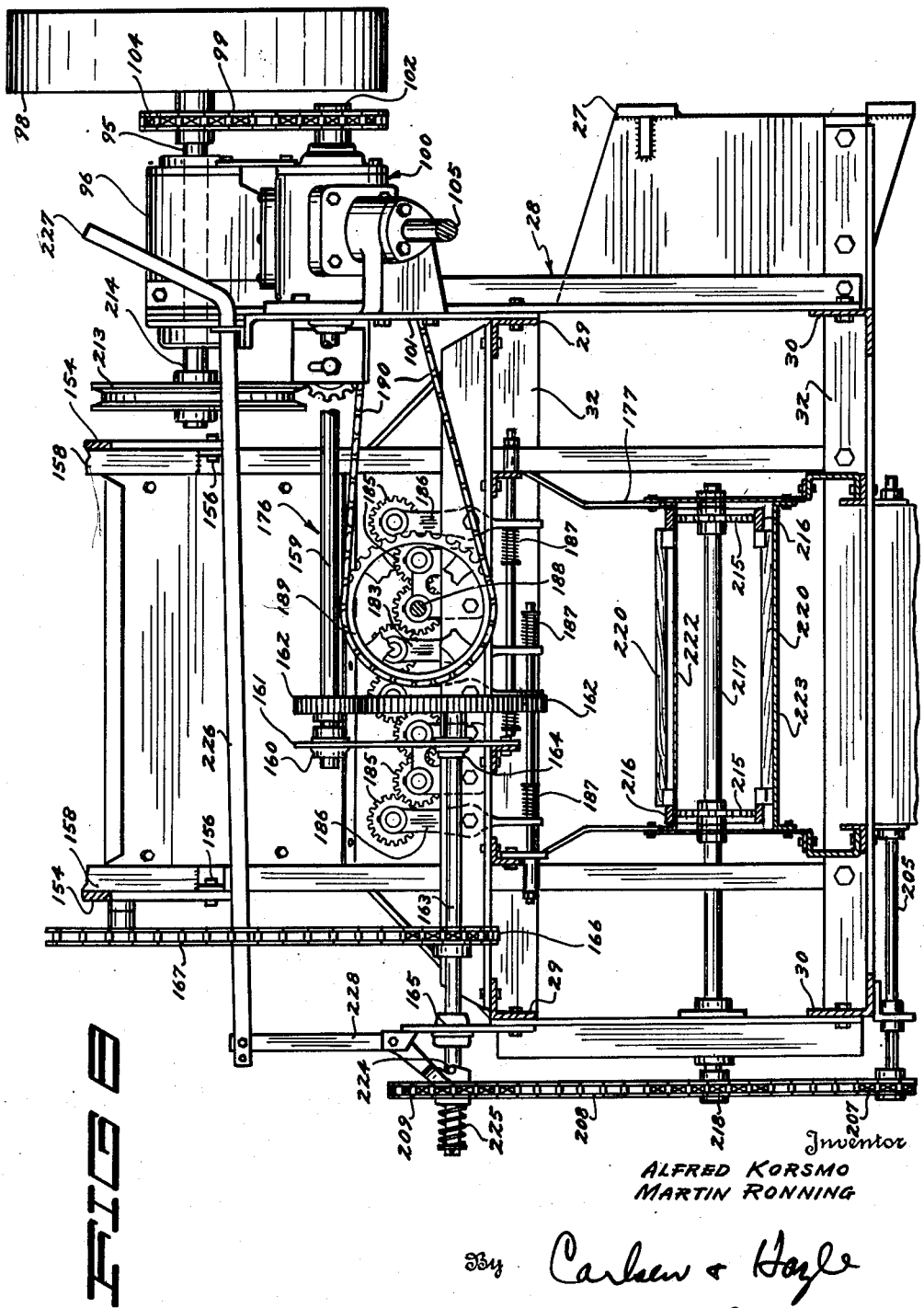

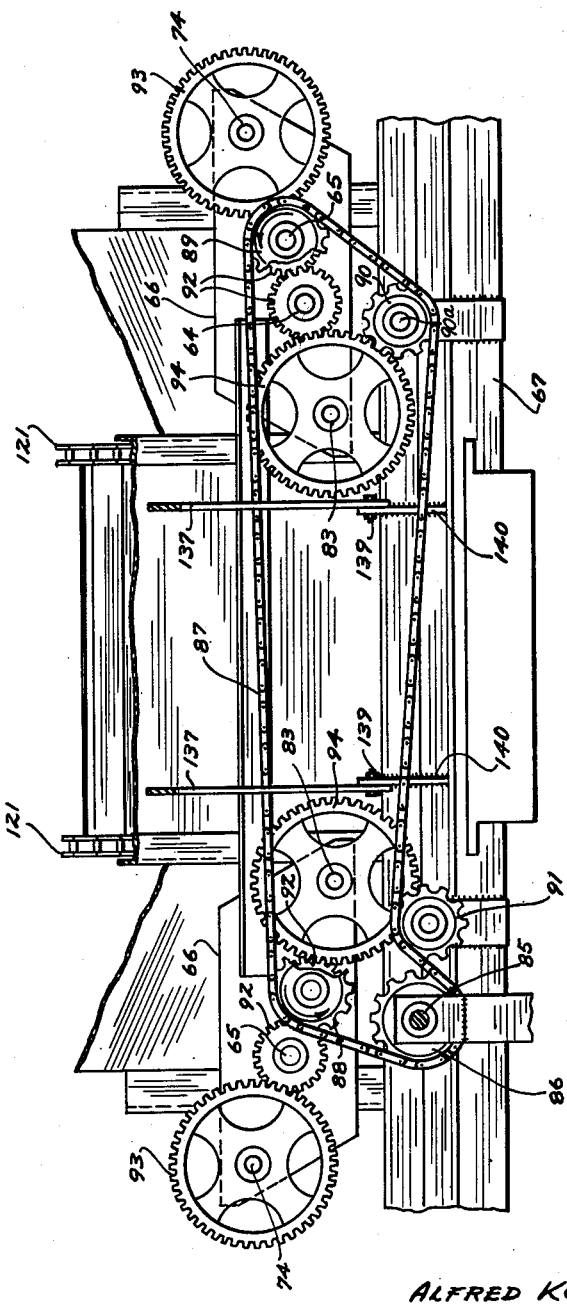

2,641,887

UNITED STATES PATENT OFFICE 2,641,887

ROW CROP IMPLEMENT-TRACTOR COMBINATION

Alfred Korsmo, Hopkins, and Martin Ronning, St. Louis Park, Minn., assignors to Minneapolis-Moline Company, Hopkins, Minn., a corporation of Minnesota Application April 8, 1949, Serial No. 86,175

7 Claims. (Cl. 56—18)

This invention relates generally to improvements in self-propelled farm implements and more particularly to a tractor-implement combination for operation upon row crops. The present invention relates further to certain improvements in the type of implement and tractor disclosed in Patent No. 2,524,083, issued October 3, 1950, for Self-Propelled Implement.

The primary object of our present invention is to provide an improved self-propelled row crop harvester, specifically a two row corn picker, which has numerous advantages both as to operation and construction over prior equipment of this general nature. This invention further provides an improved straight-through type of two row harvester embodying as its main elements, and in combination with the supporting and propelling vehicle, a forwardly arranged two row picker unit and a rearwardly arranged husking unit, with an intervening conveyor operative to deliver the crop from the forward unit rearwardly to the rear unit. A further and related object of the invention is to provide in such a machine a linkage and pivot mechanism operative in such manner as to permit the necessary up and down adjustments of the picker unit while maintaining the intervening or connecting crop conveyor between the said two main units in an operative condition, and likewise maintaining the various drive mechanisms in their operative conditions.

A further object is to provide an improved construction for a corn harvester, embodying a frame structure carrying the husking unit and associated parts, upon the forward portion of which frame the picker unit is pivotally supported so that it may swing in a vertical plane with respect to said frame, and to the ground over which the implement travels. The implement according to our invention further includes a conveyor arranged to deliver the picked ears from the picker unit to the husking unit and such conveyor is supported at opposite ends upon the respective units in order to travel therebetween and deliver the crop from one to the other. In order then to compensate for the relative motion between the units, as the picker unit itself is swung upwardly and downwardly, we provide linkage mechanism operative to maintain the conveyor in working condition in any position of the picker unit and to maintain the necessary drive connections to the conveyor. Further in accordance with this object of our invention we provide improved drive mechanism for the snapping rolls and gathering chains of the picker unit, which is operatively arranged to maintain proper driving connections between such elements in any such adjusted position of the picker unit.

A further object of our invention is to provide a crop conveyor between relatively forwardly and rearwardly located crop harvesting and working units which has the dual function of delivering the crop from the forward unit to the rear unit, and assisting in discharge of unwanted crop material from the rear unit. As exemplified by the corn picker or harvester herein disclosed the conveyor thus operates to deliver the snapped or picked ears from the picker unit to the husking unit, and further assists in dragging out and discharging the husks removed from the ears in said husking unit.

Another object of our invention is to provide an improved tractor-implement combination having a single drive connection from the tractor to the implement, which is arranged to be conveniently disconnected when the implement is removed from the tractor, and which further includes a simple and practical drive distributing mechanism by which the power from said drive connection is distributed or transmitted to all of the various working parts of the implement itself.

Another object of our present invention is to provide an improved tractor-implement embodying a tractor having wide spread, forwardly arranged traction wheels, and a narrow body or chassis extending rearwardly substantially in alignment with one of said wheels and beneath the rear of which body a steering unit or wheel is arranged to follow substantially in tandem or tracking alignment with the same traction wheel. Thus the tractor construction provides space alongside the tractor body, and substantially centered with respect to said traction wheels, in which the implement itself may be disposed, places the majority of the weight of the implement directly on the traction wheels and locates the implement in position for operation upon crop rows straddled by said traction wheels as the machine moves over the field.

A further and related object of the invention is to provide a self-propelled implement embodying a tractor of the type described above and an implement having a forwardly arranged, comparatively wide, harvesting unit located between the traction wheels and forwardly thereof, and delivering crop material to a relatively narrow crop working unit located immediately alongside the body of the tractor. The tractor-implement combination thus is quite compact and readily maneuverable, both of which characteristics facilitate its transport or travel, as well as its actual work in the field.

These and other more detailed and specific objects will be disclosed in the course of the following specification reference being had to the accompanying drawings, in which—

Fig. 1 is a side elevation of a self propelled implement or tractor-implement combination according to the present invention and with front and rear end portions thereof omitted.

Fig. 2 is a plan view with parts broken away of the implement and tractor, on a slightly reduced scale, and illustrating how it travels between and operates upon row crops.

Fig. 3 is a fragmentary, side elevational view of the central and forward portions of the implement, showing the picker unit adjusted to a lowered position near the ground, and with a portion of the side shield of such unit omitted in order to better disclose the construction, the near wheel being removed and the axle shown in section.

Fig. 4 is a view identical to Fig. 3 showing the picker unit elevated to a higher position, the near wheel being omitted and the axle shown in section.

Fig. 5 is a side elevation of the forward portion of the implement viewing the same from the side opposite Figs. 1, 3 and 4, and in this view the axle construction connecting the traction wheels of the tractor is shown in cross-section, and the near wheel being omitted.

Fig. 6 is a longitudinal, vertical sectional view taken substantially along the line 6—6 in Fig. 2 and showing certain portions of the tractor itself in dotted lines.

Fig. 7 is an enlarged side elevation of the central portion of the implement partially broken away and in vertical section.

Fig. 8 is a fragmentary vertical cross-sectional view, taken substantially along the line 8—8 in Fig. 7.

Fig. 9 is a fragmentary cross sectional view taken substantially along the line 9—9 in Fig. 3 and showing the drive mechanism for the snapping rolls and gathering chains.

Referring now more particularly and by reference characters to the drawings the tractor or vehicle element of the self propelled implement will first be described in such detail as necessary for the proper disclosure of the present invention. The tractor is designated generally by the reference character A and, as best seen in Fig. 2, it comprises a comparatively narrow and elongated body or chassis, on which is an internal combustion engine 10 which provides motive power for the tractor, and operating power for the implement associated therewith. The said narrow body part of the tractor further includes a frame or chassis structure designated generally at 11 at the forward end of which an operator's station 12 is located in an elevated position. The forward end of the tractor is supported by wide spread traction wheels 13 and 14 which are connected by a live axle 15 located within the tubular axle housing 16 rigidly connected to and supporting the tractor body. The traction wheel 13 is located immediately beneath the forward end of the narrow tractor body, whereas the other wheel 14, while located in axial alignment with the wheel 13, stands or runs well out to the side of the tractor. The rear end of the tractor body is supported by a steerable or dirigible rear supporting unit in the form of a single wheel 17 pivotally mounted upon a vertical axis as designated at 18, and suitably connected for steering operations to a steering wheel 19 located adjacent the operator's station 12. This steerable rear wheel 17 is located in tandem with the traction wheel 13, or substantially so, in such manner as to run in tracking alignment therewith or outside of the two crop rows straddled by the traction wheels, as shown in Fig. 2. As pointed out in greater detail in the hereinbefore identified prior Ronning patent the engine 10 is connected to drive the traction wheels 13 and 14 under control of the operator in order to propel the tractor forwardly or rearwardly as desired, and as seen in Fig. 2 the engine also operates, by means of a power output shaft 20, a suitable belt pulley over which may be trained a belt 21 for operating the working parts of the implements as will be later pointed out, the drive being established or disabled by means of a manually controlled belt tightening pulley also as pointed out in said patent.

It will be seen that the tractor as thus constructed provides a wide, transversely extending support between the wide spread traction wheels 13 and 14, and space alongside the narrow body of the tractor centered with respect to such wheels, for the accommodation of an implement in such manner that the tractor-implement combination is comparatively compact and occupies but little more space or ground area than the implement alone. The combination is extremely maneuverable and is in fact, much more so than the ordinary arrangement of tractor and trailing implement which forms a quite elongate train of equipment. Furthermore, as one of the chief and most advantageous concepts embodied in this and the prior Ronning inventions, we propose, as set out in detail in Ronning patent, by the use of the special tractor and the conveniently engaged and disengaged supporting and driving connections made possible between tractor and implement, to materially reduce the aggregate cost to the farmer of his equipment, such as the combine, corn picker, wagon, spreader, and all of the other large machines ordinarily operated by a tractor. As one example of the savings made possible it will be at once apparent that the implements used with the special tractor will be considerably simplified by the fact that they need no wheel supports whatever, nor do they need the associated chassis frames. These not only add costs but increase the necessary storage space. The tractor itself, provides all necessary support and transport for the implements whatever kind they may be.

In practice each implement is supported at three points upon the tractor and these three points of support are located adjacent to or in alignment with the three supporting wheels of the tractor, heretofore designated at 13, 14 and 17. The two forward supports, located in alignment with the traction wheels 13 and 14, comprise upwardly flaring pockets or sockets 22 which form rigid upward extensions of the axle housing 16 and to fit into these sockets the implement will have complementarily downwardly tapering feet 23 which will guide themselves into place in the sockets and form a stable supporting connection therewith. In order to lock the feet 23 in place, and therefore prevent any upward dislodgment of the implement such as might be caused by travel over rough terrain, the sockets 22 may be provided with releasable latch pins 24 for engagement with openings 25 formed in the feet. These openings appear in Figs. 6 and 7. The third point of support is located adjacent to the rear steerable wheel 17 and takes the form of a clip 26 mounted upon the side of the tractor frame 11 and opening upwardly to accommodate a hanger plate 27 upon the adjacent rear corner of the implement. Inasmuch as these mounting devices have been disclosed in detail in the prior Ronning patent it is thought that no further description should be necessary herein.

The construction of the implement will now be described with particular reference to the two-row corn picker herein disclosed and the implement comprises a main frame structure of a somewhat box like construction, this main frame being designated generally by the reference numeral 28. The frame may be fabricated from conventional angle irons and channels in accordance with modern production methods and comprises as its main elements, upper and lower frame bars 29 and 30 respectively at each side, which are spaced apart by vertical frame bars 31 and joined by transversely extending cross-bars 32. It is to these frame bars as clearly shown in the drawing that the supporting feet 23 and hanger plate 27 are connected but inasmuch as the details of the frame structure will vary for the different types of implements it will not be described in further detail at this point, and instead, as the description of the various working parts of the implements proceeds such elements of the frame structure as necessary to a complete comprehension of the construction will be referred to as needed.

Arranged forwardly of the main frame structure 28 is a picker unit indicated generally at 33 and which itself has a frame structure designated generally at 34 the parts of which will also be referred to as necessary in the course of the following description. The picker unit 33 is pivotally or movably supported for up and down movements at its forward end and for this purpose forwardly and rearwardly extending main frame bars 35 forming part of the frame structure 34 are pivoted by pins 36 upon brackets 37 affixed to the forward lower portion of the frame 28. This mounting is best shown in Fig. 7 and it will be apparent that the entire picker unit 33 may swing in a vertical and longitudinal extending plane about the axes of the pins 36. Such movements of the picker unit are accomplished and controlled hydraulically and the power lift structure for this purpose comprises a transversely extending rockshaft 38 journaled ahead of the axle housing 16 in suitable bearing brackets 39 secured thereto, and secured to the rockshaft 38 are downwardly extending arms 40 from which lift bars 41 extend forwardly out beneath the picker unit. The rear ends of the bars 41 are pivoted at 42 to the ends of the arms 40 and the forward ends are pivoted at 43 to brackets 44 forming part of the picker frame structure 34. The rockshaft 38 also has an arm 45 depending below the axle housing 16 and pivoted at 46 to the lower end of this arm is a rearwardly extending push rod 47. The rear end of the push rod is pivoted at 48 to a swingable arm 49 on one side of the tractor frame 11. A conventional hydraulic ram or fluid motor 50 is pivoted at 51 to the frame 11 and its forwardly extending and fluid reciprocated plunger 52 is also connected to the lower end of the aforesaid arm 49. It will be obvious that the forward and rearward motion of the plunger 52 and connected rod 47 by the ram 50 will so oscillate the rockshaft 38 as to raise and lower the picker unit 33, respectively. Fluid admission to and return from the ram 50 is controlled from the operator's station on the tractor in the usual manner.

As here exemplified the picker unit 33 is designed for picking two rows of corn simultaneously and for this purpose it has right and left hand pairs of picking rolls, and opposed, cooperating upper and lower gathering chains in the usual fashion of such machines. For guiding the crop into engagement with the picking rolls and gathering chains the picker unit has a center snout or dividing point 53 and laterally disposed gathering points 54 and 55 forming rearwardly converging openings leading rearwardly into slot-like spaces 56 wherein the aforesaid picking rolls and gathering chains are provided and operated. The snout 53 runs rearwardly into a center sheet 57 the opposite margins of which slope laterally toward the spaces 56 while the gathering points 54 and 55 extend rearwardly to gathering sheets 58, the inner and upper surfaces of which slope inwardly toward the said openings. The gathering sheets 58 further have the usual hanging side shields 59 and this entire sheet and point structure is fabricated as usual of sheet material, and is braced by the usual tubular tie member 60.

As stated above inner and outer snapping rolls 61 and 62 are arranged in each of the rearwardly extending spaces 56 parallel therewith and operate in the usual manner upon stalks of corn guided through the said spaces, during the forward travel of the implement, to snap the ears of corn from the stalks. The snapping rolls themselves are entirely conventional in construction and operation and are rotatably supported at their forward ends by suitable bearings attached to sills 63 which extend along and define the lateral and forwardly diverging margins of the spaces 56. The snapping rolls incline upwardly and rearwardly also in the usual manner, and at their upper rear ends they have axially extending shafts 64 and 65, which are journaled through suitable bearings mounted in angle bracket plates 66 forming part of the picker frame structure 34 and attached (as best seen in Fig. 6) to a transversely extending hollow beam 67. The said beam is rigidly connected to the frame structure 34 by suitable brackets and gussets and rigidly ties together the aforesaid pivot pins 36 by which the entire picker unit is swingably supported upon the main frame structure 28.

The picker unit also includes the usual gathering chain mechanism for guiding and pulling the stalks through the snapping rolls and this mechanism includes, for each set of snapping rolls an outer gathering chain 68 having the usual lugs 69 and suitably supported upon sprockets at its opposite ends in order that its flight or span nearest and above the picking rolls will run in a rearward direction parallel with the axes of the rolls. The rear ends of each of the outside gathering chains operates over sprockets 70 having shafts 71 rotatably supported in gear boxes 72 secured to the frame structure 34 as seen in Figs. 3 and 4. Interiorly of the gear boxes 72 the sprocket shafts 71 are connected by means of bevel gears 73 to upwardly and rearwardly extending drive shafts 74 journaled also through the associated bracket plates 66, outwardly and slightly above the snapping roll shafts 64 and 65. The gathering chain mechanism also includes upper and lower inside gathering chains 75 and 76 located inwardly of each snapping roll set and likewise journaled upon suitable sprockets so that their outer flights travel parallel with the snapping rolls along the inside edges of the spaces 56. These gathering chains 75 and 76 have the usual lugs 77 and at their rear ends they operate around drive sprockets 78 and 79 upon common drive shafts 80. The drive shaft 80 for each set of inside gathering chains extends into and is rotatably supported by a gear box 81 in which bevelled gears 82 connect the drive shaft to an upwardly and rearwardly extending shaft 83 journaled through the bracket plate 66 at each side of the picker inwardly of the snapping rolls shafts 64 and 65.

The drive mechanism for the snapping rolls and gathering chains is best shown in Fig. 9 and referring thereto it will be seen that the drive mechanism is common to all of these operating elements and that the drive is transmitted from one side to the other through a sprocket chain and associated sprockets as will now be described. Upon the side of the picker unit nearest the tractor a bearing structure or clip assembly 84 is supported by the cross-beam 67 and rotatably supported in this structure is a shaft 85 whereon is mounted a main drive sprocket 86. The shaft 85 and drive sprocket 86 appear in Fig. 9, whereas the bearing or clip structure supporting these elements is seen best in some of the other views, such as Figs. 6 and 7. The manner in which the shaft 85 is driven from the tractor will be later described in detail but it will suffice for the moment to indicate that it is driven in a counterclockwise direction as viewed in Fig. 9 and as shown by the direction arrow upon the sprocket 88. The drive transmitting sprocket chain is designated at 87 and it is trained around the drive sprocket 86 and over a sprocket 88 upon the adjacent inner snapping roll shaft 64 and thence across the back of the picker unit over a similar sprocket 89 upon the outer snapping roll shaft 65 at the opposite side. The chain then passes downwardly over an idler sprocket 90 below the shafts 64 and 65, journaled by a conventional stub shaft 90a on the bracket plate 66, and returns to the tractor side of the machine where it runs over a similarly mounted idler sprocket 91 and downwardly around the drive sprocket 86. Thus the drive is initially transmitted to one of the snapping rolls shafts at each side of the machine and both shafts 64 and 65 at each side are provided with the usual meshing gears 92 so that the snapping rolls of each set will be rotated in opposite directions. The drive is then transmitted to the shafts 74 operating the outer gathering chains 68 by means of gears 93 upon the said shafts and meshing with the gears 92 upon the outer snapping rolls shafts 65. In a similar fashion the drive is finally transmitted to the shafts 83 operating the inner gathering chains 75 and 76 by means of gears 94 secured on said shafts and meshing with the gears 92 upon the inner snapping roll shafts 64. It will, of course, be understood that the direction and rotation of all of these shafts is such as to produce the proper motion of the snapping rolls and gathering chains.

The shaft 85, which operates all of the snapping roll and gathering chain drive mechanisms, is itself driven from a common operating shaft 95 which is journaled and supported by means of a suitable bearing structure 96 upon the side of the main frame 28 adjacent the tractor and which is located in an elevated position and suitably braced to the frame by brace bars 97 appearing in Fig. 5. This shaft 95 is provided with a belt pulley 98 over which the aforesaid belt 21, operated by the tractor engine 10, is trained in order to transmit the drive between tractor and implement. It is to be noted that each type of implement having operating parts requiring drive from the tractor will have a similar belt pulley, located in the same relative position with respect to the shaft 20 driven by the tractor engine, in order that the same drive belt 21 may be used for all implements. Inasmuch as a belt tightener is used, as set out in the Ronning patent, in order to engage or disable the drive connection it is, of course, obvious that the belt 21 may be loosened and readily placed over the drive pulley on the implement, as each such implement is mounted upon the tractor. It is thus seen that actually there are only four connections between tractor and implement, as represented by the two wide spread forward supporting feet 23, the hanger plate 27, and the drive belt 21.

Power from the belt driven shaft 95 is applied by means of a sprocket chain 99 to an angle drive unit designated generally at 100 mounted upon a plate 101 forming part of the main frame 28 and located forwardly of and beneath the belt pulley 98. The said angle drive unit 100 has power input shaft 102 upon which is mounted a sprocket 103 in alignment with a sprocket 104 upon the shaft 95 and the sprocket chain 99, of course, operates over these two sprockets. Interiorly of the housing of the drive unit 100 the shaft 102 is connected by suitable gears (not here shown) to rotate a stub shaft 105 extending forwardly and angling downwardly toward the shaft 85 hereinbefore identified. Connection between the shafts 105 and 85 is made by means of universal joints 106 and 107 and a connecting shaft 108 therebetween so that flexibility is provided between the drive unit 100 and the drive mechanism extending across the rear of the picker unit, to accommodate for the up and down swinging movements of the picking unit as presently described. It will also be readily understood that, in addition to the changing angles between the shafts 85 and 105 brought about by the up and down movements of the picker unit, there will be required a variation in length of the connection between such shafts and this is made possible by means of a splined connection 109 between the shaft 108 and one of the universal joints. Thus the connection between the shaft 85 and 105 may decrease in length as made necessary by the upward movement of the picker unit, and vice versa.

At this point attention is called to the provision of heavy coil springs 110 at opposite sides of the implement and which act as counter-balance springs to yieldably bias the entire picker unit upwardly about its pivots 36, and so act to support a part of the weight of such unit. These springs 110 are coiled about rods 111 which are pivotally attached at 112 to brackets 113 on the sides of the main frame 28 and these rods angle downwardly and forwardly as shown in Figs. 4, 5 and 7. At their lower ends the rods 111 are slidably mounted through blocks 114 pivotally supported by trunnions 115 in arms 116 forming rigid rearward extensions of the picker unit frame bars 35. The arms 116 are rearwardly bifurcated to accommodate the blocks 114 and as the picker unit swings downwardly it will be evident that the rear ends of the arms, being located rearwardly of the pivots 36, will swing upwardly and so compress the springs 110.

The foregoing completes the construction of the picker unit per se, but forming an operative and connected part thereof is an ear conveyor or elevator, designated generally at 117. This conveyor performs the necessary function of elevating the snapped ears of corn from the snapping rolls upwardly and rearwardly and delivering these ears to the husking mechanism, later to be described, and which is located in the main frame 28. At its lower forward portion the ear conveyor 117 operates in an opening 118 at the upper rear center of the picker unit and extends down into a conveyor well housing 119 depending from the frame structure 34 of the picker. This lower forward portion of the conveyor 117 thus operates between and beneath the upper rear end portions of the snapping rolls 61 and 62 and guide sheets 120 are arranged upon opposite sides of the conveyor in such manner as to direct the snapped ears of corn from both sets of rolls inwardly toward the conveyor. Inasmuch as the conveyor must operate in such relation to the snapping rolls in all positions of the picker unit it follows that the conveyor must be mounted as a connected part of the picker unit to move therewith. On the other hand, the upper delivery end of the conveyor should bear a more or less fixed relation to the husking unit into which it delivers the snapped ears of corn and furthermore, since this is the driven end of the conveyor, it must maintain a definite relation to its drive connection so that the drive will be properly transmitted in all positions of the picker unit. The construction and arrangement of the conveyor and the mechanism by which all of these problems are solved will now be described in detail.

The conveyor 117, in accordance with the usual practice, comprises transversely spaced conveyor chains 121 located at the opposite lateral margins of the conveyor and connected at intervals by transverse paddles or flights 122 which engage and travel the ears of corn in an upward direction. These chains 121 as best shown in Fig. 6, are trained over sprockets 123 which are rotatably supported at the lower portion of the conveyor well 119 by means of a shaft 124 carried in bearings 124a (Fig. 3) on the picker frame. From these sprockets 123 the conveyor chains 121 run upwardly and rearwardly and the chains are guided in such travel by lower angle iron guides 125 and upper guires 126, at each side. These guires 125 and 126 are also joined by flat sheets 127 and 128, respectively, which in effect form the bottom of the conveyor so that the ears do not fall through between the paddles 122. The lower guide bars 125 are secured to the inwardly and downwardly extending aprons 129 which form the sides of the conveyor well 119 so that these guide bars and the associated sheet 127 move as a unit with the picker. The mounting and relation of the upper guide bars 126 and bottom sheet 128 with the lower elements just described will be presently pointed out. At the upper end of the conveyor the chains 121 operate over transversely spaced drive sprockets 130 which are secured upon a sprocket shaft 131 journaled in bearing plates 132. These bearing plates 132 are adjustably mounted in the usual manner, for adjusting the conveyor chain, upon side plates 133 between which is carried a sheet metal bonnet 134. The bonnet has the usual curved top portion and a downwardly and rearwardly opening rear end 135 through which the conveyor will deliver the snapped ears. This bonnet structure and the entire head end assembly of the ear conveyor is supported upon the upper ends of side or support links 137, arranged one at each side of the structure, and secured as designated at 138 to the side plates 133. These links angle downwardly and forwardly and at their lower ends they are pivotally attached by pins 139 to bracket plates 140 secured to the upper side of the cross beam 67. Near their lower ends the side links 137 are rigidly cross connected by an angle bar 141 in order to move as a unit about the axes of the pins 139 and along with the picker unit 33. The downwardly moving rear portion of the conveyor is supported over its upper length by lateral guide bars 142 secured to the inner sides of the side plates 133 and extending downwardly in diverging relation to the links 137, between the forward ends of the main frame bars 29. These rear guide bars 142 take the form of angles, the inwardly turned webs of which engage and guide the conveyor chains 121, and the guide bars are secured by means of tie bars 143 to the links 137. At their upper ends the guide bars 142 curve rearwardly and upwardly, as indicated at 144 in Fig. 6, to properly meet and engage the chains as they run forwardly from beneath the drive sprockets 130. From the point at which they leave the lower ends of the guide bars 142 the conveyor chains 121 angle downwardly and forwardly in the clear past the forward end of the main frame structure 28 and beyond the axle housing 16 to the rear portion of the conveyor well 119. At these points the conveyor chains run beneath idler sprockets 145 carried in suitable bearings 145a attached to angles 146 forming part of the picker unit frame structure. The conveyor chains then run forwardly beneath the sprockets 123 and then back up toward the head or delivery end of the conveyor. The angle of the path the chains travel changes as they leave the guide bars 142, and to hold them in place clips 147 are secured to the guide bars as seen in Figs. 6 and 7.

The lower ends of the upper forward guide bars 126 are provided with bracket ears 148 by which they are pivoted at 149 to similar ears 150 attached to the upper ends of the lower guide bars 125. There is thus provided a flexible joint between upper and lower portions of the conveyor guides, located above the pivots 36 and substantially in the vertical plane thereof, and in order to accommodate the flexing motion between upward and lower conveyor parts the lowermost conveyor bottom sheet 127 loosely overlaps a downwardly angled lower lip 151 of the upper sheet 128. At their upper ends the guide bars 126 are provided with clips 152 which slidably engage fingers 153 secured in forwardly and downwardly angling positions to the inner sides of the side plates 133. The upper end of the conveyor is further supported and controlled in its movements by tie bars 154 pivoted at one end at 155 to the said plates 133 rearwardly of the shaft 131. These tie bars 154 angle downwardly and rearwardly and at lower ends are pivotally attached at 156 to ears 157 secured to upright bars 158 upon the opposite sides of the main frame 28.

The drive mechanism for the ear conveyor or elevator 117 is also taken from the angle drive unit 100, by means of a shaft 159 which extends inwardly across the main frame 28 near its forward end and is journaled at its extremity in an upper bearing 160 on a bearing plate 161 bolted to a central part of said frame. See Fig. 8. A gear 162 upon the shaft 159 meshes with a gear 162 upon a countershaft 163 journaled in a lower bearing 164 in the plate 161 in order to drive said countershaft. At its opposite end the countershaft is journaled through a bearing plate 165 bolted to the side of the frame 28 opposite the tractor and inwardly of this bearing plate the shaft carries a sprocket 166. A sprocket chain 167 is trained over the sprocket 166 and runs upwardly and rearwardly over a sprocket 168 upon the adjacent end of the conveyor drive shaft 131 as best seen in Fig. 7. Rearwardly the sprocket chain 167 operates over an idler or take up sprocket 169 rotatably carried upon a stub shaft 169a projecting from a bearing plate 171 secured to the upper end of the adjacent upright bar 158 and braced as indicated at 172. The conveyor drive chain 167 also operates over a sprocket 173 on a shaft 174 and this shaft is utilized to drive a part of the husking unit later to be described. It will, of course, be understood that the direction of rotation of these various driving parts will be such as to rotate the conveyor drive shaft 131 in a counterclockwise direction as viewed in Fig. 7 thus to so operate the conveyor 117 that its forward portion will travel upwardly as necessary to deliver the snapped ears from the picking unit to and through the bonnet 134.

The operation of the linkage mechanism supporting the upper or head end of the conveyor 117, and as constituted by the links 137 and tie bars 154, is such as to maintain the conveyor and its drive mechanism in operative condition in all positions of the picker unit. Referring to Figs. 3 and 4 it will be noted that the picker unit is adjustable through a considerable range from the lowermost position of Fig. 3 to the elevated position of Fig. 4. Assuming the picker unit to be in its lower position an upward movement of the unit about its pivots 36 will tend, of course, to project the entire conveyor mechanism in an upward and rearward direction and this motion is transmitted to the head end of the conveyor through the links 137. This travel of the head end of the conveyor is however, prescribed and restricted to an arc centered about the axis of the pivots 156 by the swinging tie bars 154, the upper ends of which travel an arcuate path as the conveyor is so projected. The axes about which these relative movements take place, as represented by the picker pivots 36, the side link pivots 139 and the tie bar pivots 155—156, are all so related that the motion of the conveyor head will have no appreciable effect upon the tautness of the driving chain 167, and it will furthermore be understood that, since the entire conveyor system and the links 137 by which it is held upwardly and rearwardly are all closely related to the axes of the pivots 36, the aggregate motion of the upper end of the assembly is comparatively slight. This not only has the beneficial effect of a very minor variation in the point of delivery of the snapped ears in all positions of the picker unit, but also permits the tie bars 154 to maintain the drive chain 167 in a state of operative tautness under all conditions as stated above. The up and down movements of the picker unit will also cause flexing of the forward portion of the conveyor support about the pivots 149 connecting the upper and lower guide bars together but this motion also is comparatively minor. Conveyor sides or trough sheets 120a are carried by the upper guide bars 126 and fit loosely into the rear ends of the side gathering sheets 58 as seen at 120b so as to flex at these points as the picker unit is raised and lowered.

The husking unit carried by the main frame 28 will now be described in detail and the same is designated generally by the reference character 176. This husking unit comprises the usual husking box 177 which is positioned centrally in the main frame 28 and opens forwardly to receive the ears of corn delivered through the bonnet 134 by the conveyor 117 and operates, of course, to strip the husks and silks from the ears. The corn falling from the bonnet 134 is guided by a chute 178 downwardly into the upper forward end of the husking box 177 and the corn falls upon a series of eight husking rolls forming the husking bed 179. These husking rolls and their operation are entirely conventional and in the arrangement here shown there are two sets of rolls each comprising spaced, upper side rolls 180 built up of a series of disks of resilient material, and coacting with intervening lower rolls 181 having the usual husking paddles 182. The husking bed slopes downwardly and rearwardly and the forward ends of the rolls 180—181 project through a forward end plate 183 secured to the main frame structure, while at their lower rear ends the rolls are journaled through a suitable supporting plate 184 also attached to the frame. As seen in Fig. 8 the forward ends of the rolls are provided with connecting gears designated at 185 collectively to drive all of the rolls in unison in the proper directions and the uppermost rolls 180 are further supported upon swingable arms 186 engaged by springs 187, which operate to normally hold the rolls in operative condition but which permit them to spread apart whenever made necessary by husks stripped by the rolls and passing downwardly therebetween. A shaft 188 extends forwardly from one of the rolls and it is provided with a sprocket 189 over which runs a sprocket chain 190 leading laterally out toward the tractor and operating over a sprocket 191 driven by a rearwardly and downwardly angled shaft 191a from the angle drive unit 100 as seen in Fig. 5. This drive mechanism, of course, thus operates all of the husking rolls.

The aforesaid shaft 174, which is driven by the sprocket 173 from the conveyor drive chain 167, extends across the upper forward portion of the husking bed 179 and between its ends the shaft is provided with sprockets 192. A husking conveyor of conventional type is operated by the shaft 174 and it comprises transversely spaced conveyor chains 193 trained over the sprockets 192 and over similar sprockets 194 arranged at the rear end of a conveyor frame 195. The chains 193 further operate over idler sprockets 196 carried by the frame and the direction of rotation of the shaft 174 is such that this husking conveyor will run rearwardly on its underside nearest the husking bed. The conveyor chains are joined by the usual transverse paddles 197 and this motion of the conveyor tends to work the ears rearwardly over the husking bed to bring them into proper husking relation with the various husking rolls in the usual manner. The conveyor frame 195 pivots about the shaft 174 for up and down swinging adjustments at the rear end, such adjustments being made in the usual manner by cam levers 198.

The husked ears are delivered off the rear end of the husking bed 179 onto an apron 199 and thence into a wagon conveyor 200 mounted in the usual upwardly and rearwardly extending conveyor housing 201. This conveyor comprises the usual conveyor chains 202 with elevating paddles 203 and these chains operate at their lower ends about sprockets 204 on a transversely extending shaft 205 journaled in and through the lower forward end of the conveyor housing. The conveyor housing is pivotally attached at 206 to the main frame 28 so that it may be swung from its working position as shown throughout in the drawing forwardly over the machine when transporting. As one end the shaft 205 has a sprocket 207 and a sprocket chain 208 is driven from a sprocket 209 upon the extremity of the countershaft 163 in order to operate the wagon elevator. If desired the wagon elevator may be provided with the usual blower fan, the housing of which appears at 210 in Fig. 1, and to drive this fan its shaft 211 is extended toward the tractor (Fig. 2) for belt drive as indicated at 212 from a pulley 213 mounted upon an inward extension 214 of the main drive shaft 95. See Fig. 8. As best seen in Fig. 8 also, the sprocket 209 is loose on the countershaft 163 but is normally clutched to a pin 224 thereon by means of a spring 225. A hand lever 226 is mounted across the machine with a handle 227 next to the tractor, and at its opposite end is pivoted to a fork 228 by which the sprocket 209 may be declutched in order to stop the wagon elevator at any time.

The husking unit is completed by a husk and corn saver conveyor mechanism as best shown in Fig. 6 arranged lengthwise beneath the husking box 177 and comprising front and rear sprockets 214 and 215 over which transversely spaced sprocket chains 216 operate. The rear sprockets 215 are mounted upon a shaft 217 extending out through the side of the main frame and carrying a sprocket 218 also operated by the chain 208 running the wagon elevator. As seen in Fig. 1 the usual idler 219 sprocket is provided for the chain 208. The direction of drive thus imparted to the conveyor chains 216 is such that they travel forwardly at their upper flights, as indicated by the direction arrow in Fig. 6, and the chains are connected by raddles 220 operative as the conveyor moves to carry the stripped husks and sliks falling from the husking bed in a forward direction. This material falls from the forward end of the conveyor upon a forwardly and downwardly inclined transverse delivery apron 221 terminating at its forward end just short of the downwardly moving rear side of the ear conveyor 117. The important and novel purpose of this arrangement is to enable the downwardly moving side of the conveyor 117 to assist in the discharge of the husks and silks onto the ground, and it will be readily evident that as the conveyor flights 122 pass the apron 221 they will engage drag out and deliver such material in a downward direction.

Arranged below the upper flight of the conveyor chains 216 is a perforated sieve 222 through which the shelled corn which may be present in the husks and silks falling from the husking bed may drop. This shelled corn then falls through the lower flights of the chains onto a conveyor pan 223 extending the full length of the conveyor and positioned immediately beneath the lower flights of the chains 216 so that the raddles 220 will pass rearwardly in wiping relation. The raddles thus convey the shelled corn in a rearward direction and it falls into the lower end of the wagon elevator for delivery by the elevator flights 203 to the wagon. The conveyor pan 223 may also be finely perforated so that small particles of dirt falling through the sieve 222 may drop through the open side of the frame to the ground. This conveyor and sieve arrangement therefore has the dual function of discharging the husks and silks and saving the shelled corn for delivery into the wagon.

It will be apparent from the foregoing that we have provided a two-row straight through type of corn picker which may be conveniently mounted upon the tractor A and will operate to harvest the two crop rows passing between the traction wheels 13 and 14. The picker is so constructed that it may be centered with respect to the traction wheels 13 and 14 with the necessarily wide picker unit 33 located over and forwardly of the wheels, while the comparatively narrow and rearwardly located husking unit is located compactly alongside the tractor body. Other objects and advantages of the construction have been pointed out in the course of the foregoing description and it is believed that the operation will be understood to those skilled in the art without further description herein.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. A self-propelled corn harvester comprising a frame mounted on a forwardly disposed transversely spaced pair of traction wheels and supported at its rear on a steering wheel substantially aligned with one of the traction wheels, a corn picking unit adjustably supported on the frame and projecting forwardly therefrom for picking corn from crop rows straddled by the traction wheels, a longitudinally extending husking unit carried by the frame, rearwardly of the picking unit, a conveyor operatively connected to said picking unit and to said frame for conveying corn to the husking unit, a power plant mounted on the frame alongside the husking unit at the side of the frame supported by the steering wheel, and power drive connections from the power plant to the traction wheels, picking and husking units, and conveyor.

2. In a corn harvester, a chassis including a frame supported on a pair of forwardly disposed traction wheels and on a rear steering wheel substantially aligned with one of the traction wheels, a traction wheel propelling engine mounted on the frame longitudinally between the steering wheel and the traction wheel with which it is aligned, a corn picker unit mounted on and extending forwardly from the frame to pick corn from corn rows straddled by the traction wheels, and a corn husking unit mounted on the frame rearwardly of the picking unit, said picker unit having corn discharge means extending to a point adjacent the husking unit to deliver corn thereto, said husking unit being relatively narrower than the picking unit and being disposed alongside of the power plant.

3. A self-propelled two-row corn harvester comprising a frame supported on two forwardly disposed traction wheels, transversely spaced to straddle two rows of corn, and upon a rear steering wheel sufficiently offset laterally to travel substantially tandem with one of the traction wheels outside of one of said corn rows, a two-row corn picker unit mounted on the frame and extending forwardly therefrom, a husking unit mounted on the frame rearwardly of the picker unit, means for conveying corn from the picker unit to the husking unit, a power plant mounted on the frame longitudinally between the steering wheel and the traction wheel in tandem therewith so as to be disposed alongside of the husking unit, and power drive connections from the power plant to the traction wheels and to the picking and husking units.

4. A corn harvester comprising a first frame supported on a pair of forwardly disposed traction wheels transversely spaced to straddle two rows of corn, and on a rear steering wheel laterally offset to travel in tandem with one of the traction wheels outside of one of said corn rows, an engine mounted on the frame in substantial longitudinal alignment with the traction wheel at the side of the frame which is supported by the said steering wheel, for driving the traction wheels, a second frame detachably mounted on the first frame, a corn picking unit carried by the second frame to extend forwardly of the first frame to pick corn in advance of the traction wheels, a corn husking unit carried by the second frame alongside of the engine and rearwardly of the picking unit, means for conveying corn from the picking unit to the husking unit, and power drive connections from the engine to the picking and husking units.

5. A corn harvester comprising a first frame supported on a pair of forwardly disposed traction wheels transversely spaced to straddle two rows of corn, and on a rear steering wheel laterally offset to travel in tandem with one of the traction wheels outside of one of said corn rows, an engine mounted on the frame in substantial longitudinal alignment with the traction wheel at the side of the frame which is supported by the said steering wheel, for driving the traction wheels, a second frame detachably mounted on and secured to the first frame, a corn picking unit adjustably carried by the second frame and extending forwardly of the first frame to pick corn in advance of the traction wheels, means for vertically adjusting the operative position of the picking unit, a corn husking unit carried by the second frame rearwardly of the picking unit, a conveyor for delivering corn from the picking unit and to the husking unit, and power drive connections from the engine to the picking and husking units and to the conveyor.

6. A row crop harvester comprising a first frame supported on a pair of forwardly disposed traction wheels transversely spaced to straddle two crop rows, and on a rear steering wheel laterally offset to travel in tandem position with one of said traction wheels outside of one of said crop rows, said frame including an axle housing transversely connecting the two traction wheels and a laterally disposed elongated portion longitudinally connecting the steering wheel to the traction wheel in tandem therewith, an engine mounted on the said laterally disposed portion of the frame in substantial alignment with said one traction wheel and operative to drive both traction wheels, a second frame detachably mounted on the first frame and extending rearwardly from the axle housing, a crop treating unit mounted on said second frame in a position substantially alongside of the engine and connected thereto for operation thereby, a two-row crop harvesting unit tiltably mounted on the forward end portion of the second frame and extending forwardly therefrom with means to separately harvest crop from the two crop rows straddled by the traction wheels and in advance thereof, a conveyor arranged to receive harvested crop from the two harvesting means and to convey it rearwardly for delivery to the said crop treating unit, and power drive connections from the engine to the separate crop harvesting means and to said conveyor.

7. A row crop harvester comprising a first frame supported at its forward end upon a pair of traction wheels transversely spaced to straddle two crop rows, a steerable support for the rear end of the frame, laterally offset to travel in tandem position with respect to one of said traction wheels, and on the outer side of one of said crop rows, said frame including a cross member transversely connecting the two traction wheels and a laterally disposed longitudinal part connecting the steerable support to the traction wheel in tandem therewith, an engine mounted on the said longitudinal part of the frame and connected with the two traction wheels to operate the same, a second frame detachably mounted on the first frame and extending rearwardly from the aforesaid cross member thereof, a crop treating unit mounted on said second frame in a position alongside of the engine and connected thereto for operation thereby, a two-row crop harvesting unit tiltably mounted on the forward end portion of the second frame and extending forwardly therefrom with means to separately harvest crop from the two crop rows straddled by the traction wheels, a conveyor arranged to receive harvested crop from the two harvesting means and to convey it rearwardly for delivery to the said crop treating unit, and power drive connections from the engine to the separate crop harvesting means and to said conveyor.

ALFRED KORSMO.
MARTIN RONNING.

References Cited in the file of this patent

UNITED STATES PATENTS

| Number | Name | Date |
| --- | --- | --- |
| 1,155,173 | Tschantz | Sept. 28, 1915 |
| 1,166,401 | Faltin | Dec. 28, 1915 |
| 1,222,557 | McFarland et al. | Apr. 10, 1917 |
| 1,263,001 | Swofford | Apr. 16, 1918 |
| 1,445,797 | Peirce | Feb. 20, 1923 |
| 1,646,741 | Barnett | Oct. 25, 1927 |
| 1,721,387 | Gayraud et al. | July 16, 1929 |
| 1,940,851 | Everett et al. | Dec. 26, 1933 |
| 1,943,284 | Binau | Jan. 16, 1934 |
| 1,972,680 | Cushman | Sept. 4, 1934 |
| 2,022,909 | Glen | Dec. 3, 1935 |
| 2,223,704 | Powell | Dec. 3, 1940 |
| 2,264,565 | Coultas et al. | Dec. 2, 1941 |
| 2,323,087 | Everett | June 29, 1943 |
| 2,334,945 | Mitchell et al. | Nov. 23, 1943 |
| 2,379,802 | Hyman | July 3, 1945 |
| 2,427,861 | Johnson | Sept. 23, 1947 |
| 2,444,561 | Fergason | July 6, 1948 |
| 2,458,782 | Hyman et al. | Jan. 11, 1949 |
| 2,524,083 | Ronning | Oct. 3, 1950 |